(12) United States Patent
Straub

(10) Patent No.: US 6,438,925 B1
(45) Date of Patent: Aug. 27, 2002

(54) APPARATUS FOR INTRODUCING GROUPS OF FLAT, STACKED ARTICLES INTO PACKAGING CONTAINERS

(75) Inventor: Günter Straub, Schleitheim (CH)

(73) Assignee: SIG Pack Systems AG, Beringen (CH)

( * ) Notice: Subject to any disclaimer, the term of this patent is extended or adjusted under 35 U.S.C. 154(b) by 0 days.

(21) Appl. No.: 09/457,399

(22) Filed: Dec. 9, 1999

(30) Foreign Application Priority Data

Dec. 9, 1908 (CH) ............................................... 2443/98

(51) Int. Cl.⁷ ................................................. B65B 1/04
(52) U.S. Cl. .............................. 53/244; 53/531; 53/540
(58) Field of Search .......................... 53/447, 540, 531, 53/244, 541, 544; 414/788.1

(56) References Cited

U.S. PATENT DOCUMENTS

| | | | |
|---|---|---|---|
| 4,086,745 A | * | 5/1978 | Caudle |
| 4,159,761 A | * | 7/1979 | Egee et al. |
| 4,514,964 A | * | 5/1985 | Langen |
| 4,768,328 A | * | 9/1988 | Mims |
| 5,022,218 A | * | 6/1991 | Prakken |
| 5,069,019 A | * | 12/1991 | Lodewegen |
| 5,279,096 A | * | 1/1994 | Mims |
| 5,353,576 A | * | 10/1994 | Palamides et al. |
| 5,588,285 A | * | 12/1996 | Odenthal |
| 5,669,754 A | * | 9/1997 | Croteau et al. |
| 6,128,887 A | * | 10/2000 | Suokas et al. |

FOREIGN PATENT DOCUMENTS

FR    2142471    1/1973

* cited by examiner

Primary Examiner—Eugene Kim
(74) Attorney, Agent, or Firm—Venable; Gabor J. Kelemen; Chad C. Anderson

(57) ABSTRACT

An apparatus for charging containers with groups of flat, stacked items, includes a first conveying device including an item group carrying arrangement for advancing spaced groups of items in a flat-lying, stacked state; a second conveying device for placing empty containers underneath the item group carrying arrangement in a container charging station; a first charging device for releasing item groups in the container charging station from the item group carrying arrangement means into a container in a flat-lying, stacked state; and a second charging device for taking item groups in the container charging station from the item group carrying arrangement and for releasing the item groups into a container in an edge-wise standing, stacked state.

12 Claims, 3 Drawing Sheets

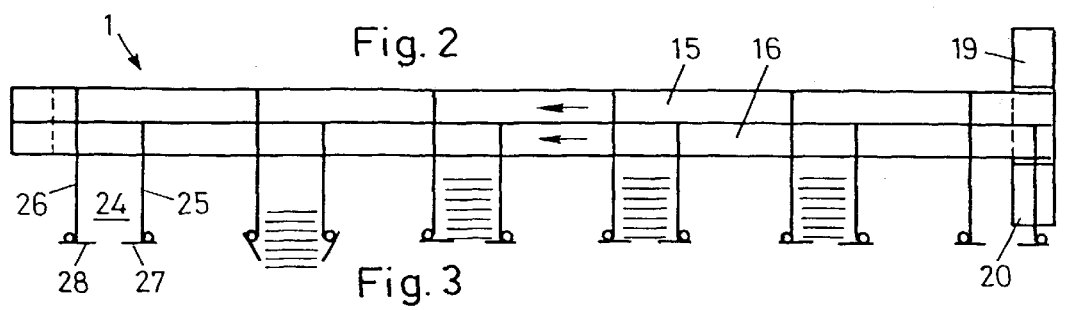
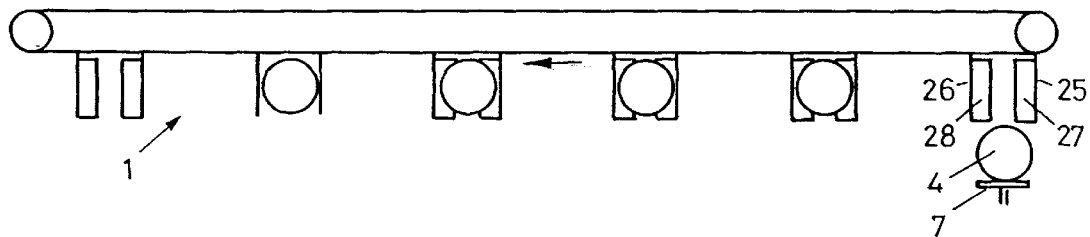
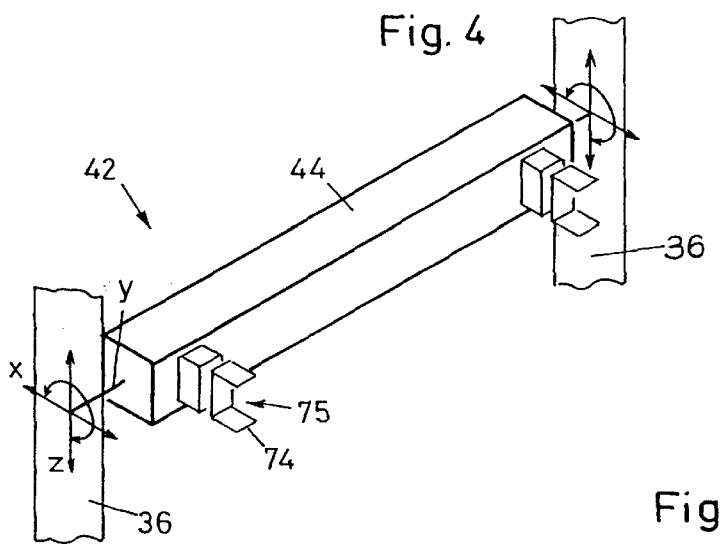
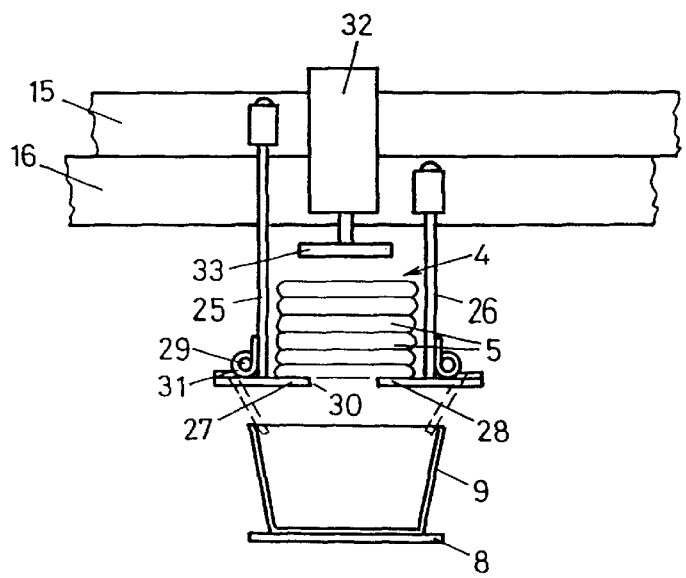

APPARATUS FOR INTRODUCING GROUPS OF FLAT, STACKED ARTICLES INTO PACKAGING CONTAINERS

CROSS REFERENCE TO RELATED APPLICATION

This application claims the priority of Swiss Application No. 2443/98 filed Dec. 9, 1998, which is incorporated herein by reference.

BACKGROUND OF THE INVENTION

This application relates to an apparatus for introducing groups of flat, stacked articles into packaging containers.

French Published Patent Application 2,142,471 discloses an apparatus for charging packaging containers (trays) with groups of flat confectionery items in a stacked state. The groups are periodically separated by a lance moved by a pusher at the lower end of a vertically oriented supply hopper and are lowered by a vertically movable carrier to a slide on which they are introduced into a standby tray by another pusher. The tray is rotated and pushed onto a removal mechanism. It is a disadvantage of such an apparatus that it is of a relatively complex structure and it does not have a satisfactory flexibility of use. The trays may be charged only with edge-wise standing items and further, a substantial number of individual steps are required to perform such a charging operation.

SUMMARY OF THE INVENTION

It is an object of the invention to provide an improved apparatus of the above-outlined type which is flexible in its application and has a simple construction.

This object and others to become apparent as the specification progresses, are accomplished by the invention, according to which, briefly stated, the apparatus for charging containers with groups of flat, stacked items, includes a first conveying device including an item group carrying arrangement for advancing spaced groups of items in a flat-lying, stacked state; a second conveying device for placing empty containers underneath the item group carrying arrangement in a container charging station; a first charging device for releasing item groups in the container charging station from the item group carrying arrangement means into a container in a flat-lying, stacked state; and a second charging device for taking item groups in the container charging station from the item group carrying arrangement and for releasing the item groups into a container in an edge-wise standing, stacked state.

BRIEF DESCRIPTION OF THE DRAWINGS

FIG. 2 is a schematic side elevational view of a first conveying device of the preferred embodiment.

FIG. 3 is schematic top plan view of the construction shown in FIG. 2.

FIG. 4 is a perspective schematic view of a component of the invention illustrating degrees of freedom of motion.

FIG. 6 is a schematic side elevational view of another component of the preferred embodiment.

DESCRIPTION OF THE PREFERRED EMBODIMENT

Figure 1:
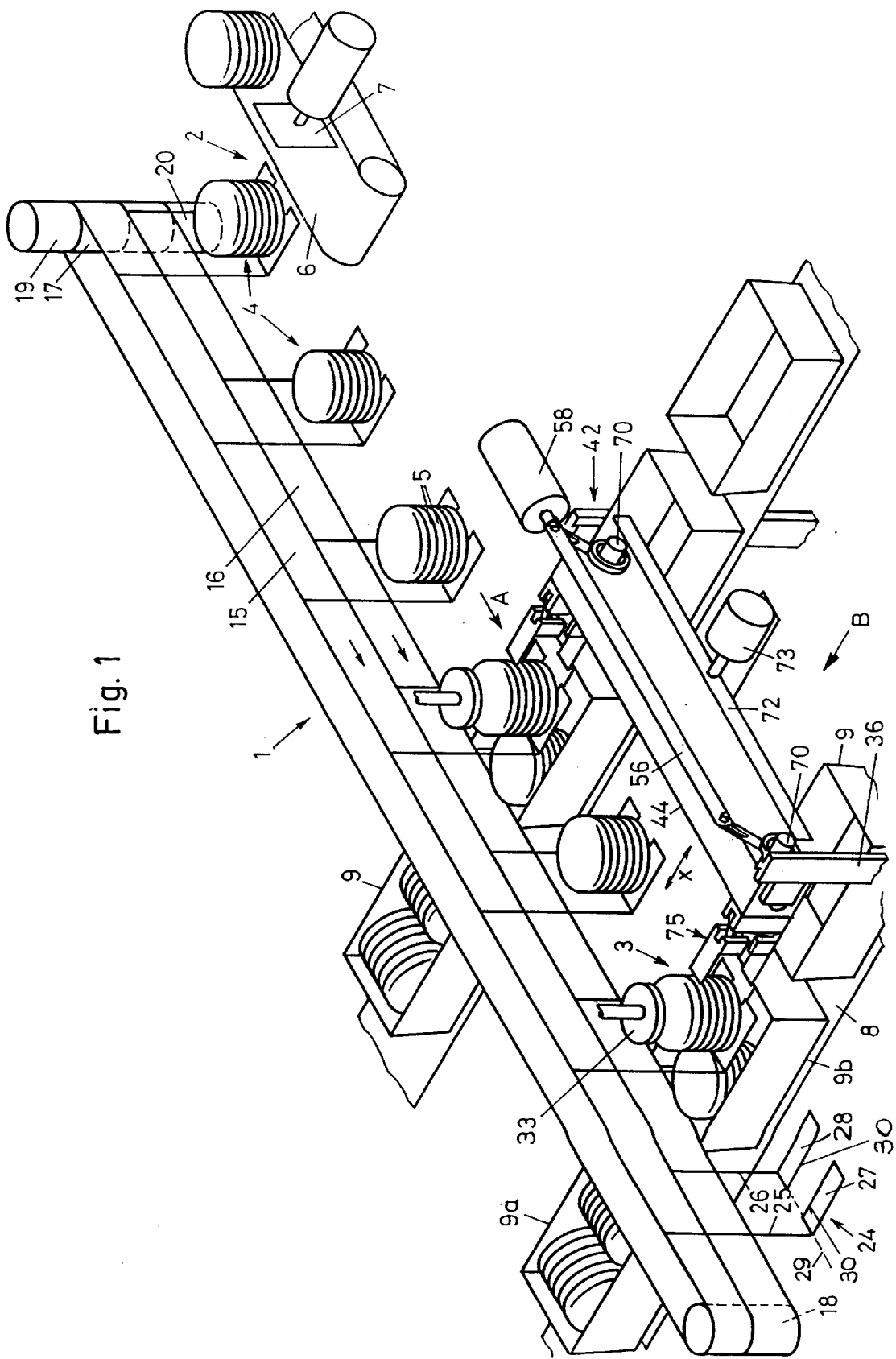
FIG. 1 is a schematic perspective view of the apparatus according to a preferred embodiment of the invention.

FIG. 1 illustrates the apparatus according to a preferred embodiment of the invention, having a first conveying device 1 advancing items in a first conveying direction A along a working track between a charging station 2 for introducing the items in the conveying device 1 and a tray charging station 3. A supply conveyor belt 6 advances groups 4 of stacked, wafer-shaped items 5, particularly confectionery items, to the charging station 2 and are transferred to the conveyor device 1 by means of a pusher 7. Underneath the conveying device 1 and oriented perpendicularly thereto, a second conveying device 8 is arranged which has a horizontal conveying direction B and on which packaging containers such as trays 9 are cyclically supplied. The trays 9 are introduced in the tray charging station 3 and are charged with items 5 in one of two ways: the items 5 are received by the tray 9 either in an edgewise standing orientation as shown for the tray 9a or in a flat-lying state as shown for the tray 9b.

The conveying device 1 has two endless, parallel extending, superposed conveyors 15 and 16, for example toothed belts, which are supported by end sprockets 17 and 18. One of the sprockets 17, 18 of the conveyors 15, 16 is driven by a respective motor 19 and 20. Carrier components 24 project downwardly from the conveying device 1 at uniform distances. The carrier components 24 are formed of two carrier arms 25, 26. The arm 25 is mounted on the conveyor 15 while the arm 26 is mounted on the conveyor 16. On the lower end of the arms 25, 26 respective carrier plates 27 and 28 are mounted for a pivotal motion about horizontal axes 29 which are oriented perpendicularly to the conveying direction A. Also referring to FIG. 6, the carrier plates 27, 28 may be pivoted downwardly from the horizontal basic position in which their edges 30 are oriented with a clearance towards one another. The carrier plates 27, 28 are biased by springs 31 into their basic position. At the tray charging station 3 a pusher 33 is arranged which is movable in a vertical direction by a drive 32 such as a linear motor. Upon actuation of the drive 32, the pusher 33 displaces the group 4 downwardly; during this occurrence the plates 27, 28 pivot downwardly against the force of the springs 31 and the group 4 is deposited into the underneath located tray 9 as a flat-lying stack.

Figure 5:
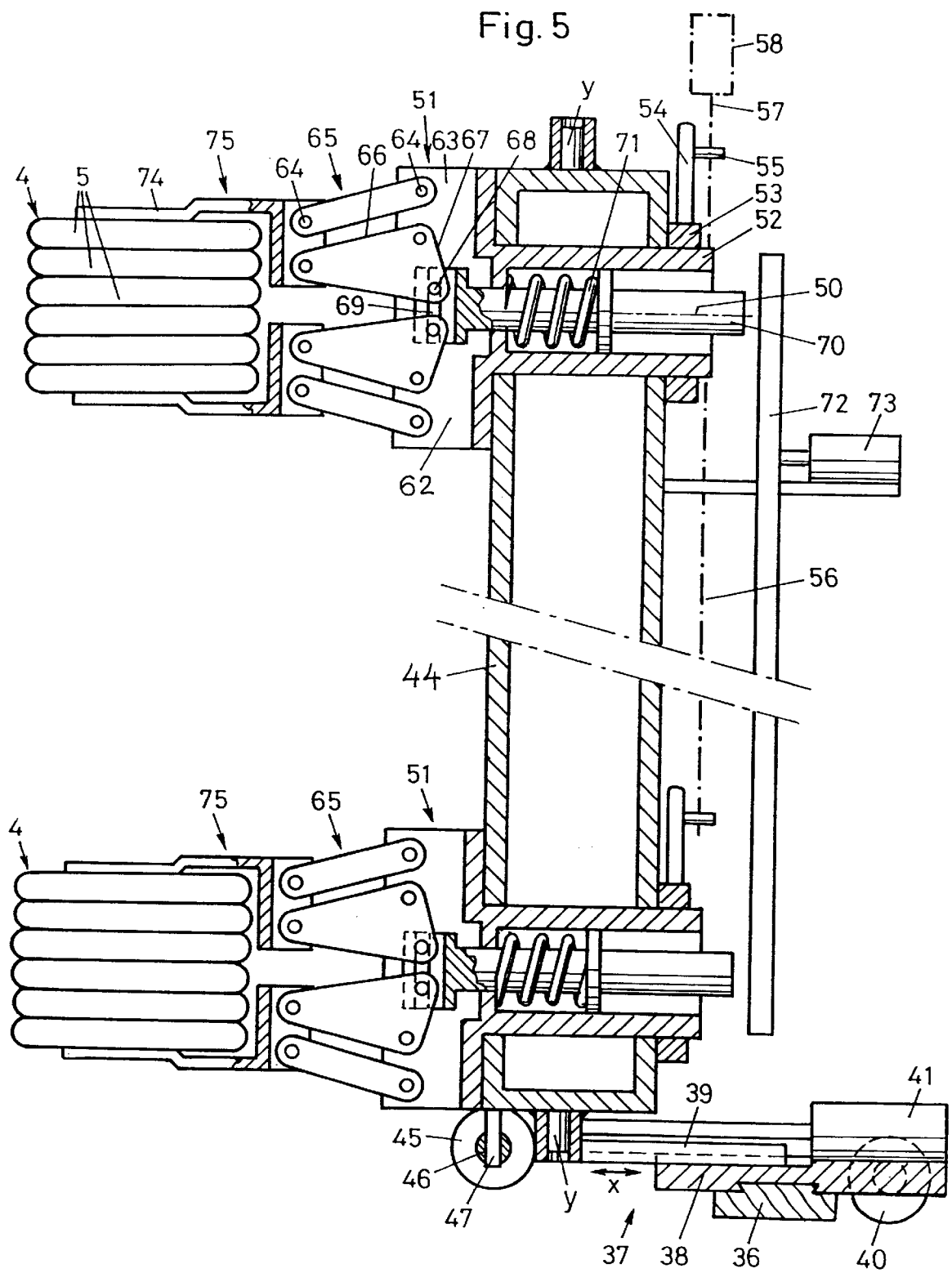
FIG. 5 is schematic sectional top plan view of the component illustrated in FIG. 4.

Turning to FIGS. 4 and 5, in addition to the tray charging device (pusher) 33 a second tray charging device 42 is provided which includes two fixed vertical columns 36 and a transverse carriage assembly 37. The carriage assembly 37 includes a carriage 38 displaceable vertically on the columns 36 (FIG. 5 shows only one column 36) and a further carriage 39 supported on the carriage 38 for horizontal travel thereon. The vertical carriage 38 is moved by means of a drive 40 whereas the horizontal carriage 39 is displaced by a drive 41. On the horizontal carriage 39 a carrier beam 44 is supported which is pivotal about an axis y oriented parallel to the conveying direction A and is thus perpendicular to the x and z directions. The pivotal motion of the carrier beam 44 is controlled by a drive 45 whose drive element 46 engages a pin 47 affixed to the carrier beam 44 eccentrically to the axis y.

A plurality of holders 51 are mounted on the carrier beam 44 and are spaced from one another at the same distance as the division of the carrier members 24 or as an integer multiple thereof. Each holder 51 is supported on the carrier beam 44 by a tubular stub 52 for rotary motion about a respective axis 50 oriented perpendicularly to the y axis. On the tubular stub 52 of each holder 51 a ring 53 is mounted from which a respective arm 54 extends. In the illustration of FIG. 5, the arms 54 are at a 45° inclination downwardly from the drawing plane. A pin 55 is affixed to the free end of each arm 54. All pins 55 are interconnected by coupling rods 56 illustrated symbolically by dash-dotted lines, and one pin 55 is connected with a drive element 57 of a drive 58. All the holders 51 are, by means of the drive 58, jointly pivotal from their end position illustrated in FIG. 5 about 90° into the basic position as shown in FIGS. 1 and 4.

Each tubular stub 52 carries, at its end opposite the ring 53, a head 62 which has a transverse slot 63 in which pins 64 are mounted to support two parallelogram linkages 65 composed of links 66. One of the links 66 in each linkage 65 has an angled arm 67, in the free end of which a respective pin 68 is inserted. The pins 68 engage into a transverse groove 69 of a plunger 70 which is urged by a spring 7 in one direction. At the ring 53 the plungers 70 project beyond the end of the tubular stub 52 and may be pressed in against the force of the spring 71 by a rod 72 which may be shifted by a further drive 73 parallel to the axis 50. Two gripping arms (gripping jaws) 74 of a gripping unit 75 are jointed to the parallelogram linkages 65. By operating the drive 73 all gripping units 75 open simultaneously. In the closed position the gripping unit 75 holds the item group 4, with a force predetermined by the biasing force of the spring 71, practically independently from the thickness of the item group 4 so that thickness tolerances are automatically compensated for.

For introducing the item group (stack) 4 in an edgewise upstanding orientation into the trays 9, first the holders 51 are, by means of the drive 58, turned into the position shown in FIGS. 1 and 4 and the gripping units 75 are opened by means of the drive 73. The conveying device 1 is stopped in the position shown in FIG. 1. The carrier beam 44 is, by means of the drive 41, advanced in the x direction and the rod 72 is retracted to cause the gripping units 75 to close. Thereafter the carrier beam 44 is retracted, the gripping units 75 are rotated 90° about the axes 50 and are pivoted downwardly about the y axis so that the item groups 4 are deposited into the trays 9. Subsequently the gripping units 75 are opened and guided back into their basic position.

The described apparatus is very flexible: the item groups may be deposited into the trays 9 selectively in an edgewise-standing or a flat-lying position. The charging operation only requires a single handling step. By adjusting the conveyor belts 15 and 16 relative to one another, the apparatus may be adapted in a very simple manner to different item widths. Such an adjustment may be made by altering the rotary angle between the two servomotors 19 and 20. The mobility of the carrier beam 44 in the z direction makes possible a very simple setting to different group thicknesses. Instead of the pivotal motion about the y axis, such a mobility may be used for depositing the item groups 4 into the trays 9. The apparatus is of modular construction; the items 5 are gently handled and a high output is achieved.

As a departure from the described embodiment, the two conveyors 15 and 16 may be driven by a joint motor in which case one of the sprockets 17 may be adjusted in its angular relationship to the other sprocket, for example, by a differential drive. In the illustrated embodiment according to FIG. 1, two grippers 75 and two plungers 33 are shown. It is to be understood that a desired number of such components may be arranged side-by-side in which case then a corresponding number of columns of trays 9 are to be presented simultaneously. It is further feasible to arrange two conveying devices 1 above one another which are provided with carrier members 24 over less than one-half of their circumference in which case the carrier arms 25 and 26 of the upper conveying device 1 are correspondingly of longer construction to ensure that all carrier plates 27 and 28 circulate in the same plane. This variant has the advantage that the operating cycle of the pusher 7 of the charging station 2 is independent from the tray charging cycle at the charging station 3 since one of the two conveying devices 1 is active at the station 2 and at the same time, the other is active at the station 3.

It will be understood that the above description of the present invention is susceptible to various modifications, changes and adaptations, and the same are intended to be comprehended within the meaning and range of equivalents of the appended claims.

What is claimed is:

1. An apparatus for charging containers with groups of flat, stacked items, comprising
   (a) a first conveying device;
   (b) a plurality of item group carrying assemblies mounted at intervals on said first conveying device for being advanced by said first conveying device in a first direction from a group charging station to a container charging station; each said item group carrying assembly holding one of the group of items in a flat-lying, stacked state; each said item group carrying assembly having, at a lower end thereof, carrier plates having a basic position; in said basic position said carrier plates being oriented horizontally and being directed toward one another for supporting a respective group of items thereon; said carrier plates having mutually facing edges spaced from one another in said basic position;
   (c) a second conveying device situated underneath said first conveying device for advancing empty containers in a second direction to said container charging station underneath one of said item group carrying assemblies dwelling in said container charging station and for transporting filled containers, charged in said container charging station, away from said container charging station; and
   (d) a separate transfer device provided for each container charging station for depositing the item groups from said item group carrying assemblies into said containers.

2. The apparatus as defined in claim 1, wherein each said item group carrying assembly comprises means for pivotally securing said carrier plates to provide for a pivotal motion of said arms downward from said basic position; further comprising means provided at each said container charging station for pivoting the carrier plates of the item group carrying assemblies downward from the basic position.

3. The apparatus as defined in claim 2, wherein each item group carrying assembly comprises springs biasing said carrier plates into the basic position; further wherein said transfer device comprises a vertically displaceable pusher for pushing the item groups out of the item group carrying assemblies.

4. The apparatus as defined in claim 1, wherein said transfer device comprises
   (a) a gripping unit including two oppositely movable gripping jaws;
   (b) means for moving said gripping unit from a basic position forwardly in a direction transversely to said first direction;
   (c) means for pivoting said gripping unit about a first axis oriented perpendicularly to said first direction; and
   (d) means for pivoting said gripping unit about a second axis oriented parallel to said first direction.

5. The apparatus as defined in claim 1, wherein said transfer device comprises
   (a) a gripping unit including two oppositely movable gripping jaws;

(b) means for moving said gripping unit from a basic position forwardly in a direction transversely to said first direction;

(c) means for pivoting said gripping unit about an axis oriented perpendicularly to said first direction; and (d) means for linearly moving said gripping unit in a vertical direction.

6. The apparatus as defined in claim 1, wherein said transfer device comprises (a) a carrier beam;

(b) a plurality of gripping units being mounted on said carrier beam; each said gripping unit including two oppositely movable gripping jaws;

(c) means for moving said carrier beam from a basic position forwardly in a direction transversely to said first direction;

(d) means for pivoting each said gripping unit about a first axis oriented perpendicularly to said first direction; and (e) means for pivoting said carrier beam about a second axis oriented parallel to said first direction;

wherein said second conveying device delivers container columns corresponding in number to the number of said gripping units.

7. The apparatus as defined in claim 1, wherein said transfer device comprises (a) a carrier beam;

(b) a plurality of gripping units being mounted on said carrier beam; each said gripping unit including two oppositely movable gripping jaws;

(c) means for moving said carrier beam from a basic position forwardly in a direction transversely to said first direction;

(d) means for pivoting each said gripping unit about a first axis oriented perpendicularly to said first direction; and (e) means for linearly moving said carrier beam in a vertical direction;

wherein said second conveying device delivers container columns corresponding in number to the number of said gripping units.

8. The apparatus as defined in claim 1, wherein said first conveying device has first and second parallel extending, superposed conveying parts; further wherein each said item group carrying assembly member includes (a) a first arm attached to said first conveying part and to a first of said carrier plates;

(b) a second arm attached to said second conveying part and to a said second of said carrier plates;

(c) means for driving said first and second conveying parts as a unit; and (d) means for adjusting a relative position between said first and second conveying parts to vary a distance between said first and second carrier plates in said basic position thereof.

9. The apparatus as defined in claim 8, wherein said means for driving said first and second conveying parts as a unit and said means for adjusting a relative position between said first and second conveying parts comprises first and second servomotors driving said first and second conveying parts, respectively.

10. The apparatus as defined in claim 1, further comprising linear motors for driving said transfer device.

11. The apparatus as defined in claim 1, wherein said first and second directions are oriented approximately horizontally.

12. The apparatus as defined in claim 1, wherein said first and second directions cross over one another approximately perpendicularly.

* * * * *

UNITED STATES PATENT AND TRADEMARK OFFICE
CERTIFICATE OF CORRECTION

PATENT NO. : 6,438,925 B1
DATED : August 27, 2002
INVENTOR(S) : Günter Straub

It is certified that error appears in the above-identified patent and that said Letters Patent is hereby corrected as shown below:

<u>Title page,</u>
Item [30], Foreign Application Priority Data, delete "Dec. 9, 1908" and insert -- Dec. 9, 1998 --.

Signed and Sealed this

Thirty-first Day of December, 2002

JAMES E. ROGAN
*Director of the United States Patent and Trademark Office*